(12) United States Patent
Ikeda et al.

(10) Patent No.: US 9,456,239 B2
(45) Date of Patent: Sep. 27, 2016

(54) WIRELESS COMMUNICATION APPARATUS

(71) Applicants: Kumiko Ikeda, Chiyoda-ku (JP); Shu Murayama, Chiyoda-ku (JP); Masahiro Abukawa, Chiyoda-ku (JP); Michinori Yoshida, Chiyoda-ku (JP); Junya Ujiie, Chiyoda-ku (JP)

(72) Inventors: Kumiko Ikeda, Chiyoda-ku (JP); Shu Murayama, Chiyoda-ku (JP); Masahiro Abukawa, Chiyoda-ku (JP); Michinori Yoshida, Chiyoda-ku (JP); Junya Ujiie, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/412,243

(22) PCT Filed: Nov. 30, 2012

(86) PCT No.: PCT/JP2012/081119
§ 371 (c)(1),
(2) Date: Dec. 31, 2014

(87) PCT Pub. No.: WO2014/083691
PCT Pub. Date: Jun. 5, 2014

(65) Prior Publication Data
US 2015/0296243 A1    Oct. 15, 2015

(51) Int. Cl.
*H04N 7/20* (2006.01)
*H04N 21/414* (2011.01)
(Continued)

(52) U.S. Cl.
CPC ...... *H04N 21/41422* (2013.01); *H04N 21/214* (2013.01); *H04N 21/2146* (2013.01); *H04N21/4126* (2013.01); *H04N 21/44008* (2013.01); *H04N 21/4532* (2013.01); *H04N 21/462* (2013.01); *H04W 4/046* (2013.01); *H04W 24/08* (2013.01)

(58) Field of Classification Search
CPC .................................................. H04N 21/2146
See application file for complete search history.

(56) References Cited

U.S. PATENT DOCUMENTS

2007/0136772 A1* 6/2007 Weaver .............. H04N 7/17318
725/95
2007/0286196 A1* 12/2007 Fan ..................... H04W 72/085
370/392

(Continued)

FOREIGN PATENT DOCUMENTS

| JP | 2003-092572 A | 3/2003 |
| JP | 2006-352522 A | 12/2006 |
| JP | 2006-352524 A | 12/2006 |

OTHER PUBLICATIONS

International Search Report issued Jan. 29, 2013 in PCT/JP2012/081119 filed Nov. 30, 2012.

*Primary Examiner* — Gigi L Dubasky
(74) *Attorney, Agent, or Firm* — Oblon, McClelland, Maier & Neustadt, L.L.P.

(57) ABSTRACT

A wireless communication apparatus which performs wireless communication with onboard information equipment installed in a vehicle includes: receiver that receives media data from the onboard information equipment; playback processing unit that outputs the media data the receiver receives; communication state retaining unit that retains a communication state between the onboard information equipment and wireless communication apparatus; usage situation deciding unit that decides a usage situation of the wireless communication apparatus from the vehicle surrounding information and generates usage situation information; quality deciding unit that decides the quality of the media data using communication state information retained in the communication state retaining unit and the usage situation information generated by the usage situation deciding unit; and transmitter that transmits the quality generated by the quality deciding unit to the onboard information equipment as media data quality information.

8 Claims, 8 Drawing Sheets

(51) Int. Cl.
*H04N 21/214* (2011.01)
*H04N 21/41* (2011.01)
*H04N 21/44* (2011.01)
*H04N 21/45* (2011.01)
*H04N 21/462* (2011.01)
*H04W 24/08* (2009.01)
*H04W 4/04* (2009.01)

(56) References Cited

U.S. PATENT DOCUMENTS

2009/0027399 A1* 1/2009 Sato .............. G01C 21/26
 345/467
2010/0131642 A1* 5/2010 Chalikouras ....... G06Q 30/0241
 709/224

* cited by examiner

| Usage Situation Information | Concrete Example of Usage Situation | Data Classification That Alters Quality |
|---|---|---|
| During Conversation | During Conversation in Vehicle | Music Data/Video Data |
| | On The Phone (During Connection to Onboard Information Equipment and The Like) | |
| During Talking of Equipment | During Voice Guidance of Navigation | |
| During Noise Generation | During Driving Through Tunnel | Music Data |
| | Window Is Open | |
| | It's Raining (It Began to Rain) | |
| During Non-Direct Vision | Looking Away from Screen | Video Data |
| | Closing Eyes | |

WIRELESS COMMUNICATION APPARATUS

TECHNICAL FIELD

The present invention relates to a wireless communication apparatus mounted on a vehicle such as a car.

BACKGROUND ART

Demand for communication between onboard information equipment and an in-vehicle wireless communication apparatus by incorporating a wireless communication function in the onboard information equipment has been growing. For example, it is conceivable to hear and watch music data and video data in the onboard information equipment such as a car navigation system (car navigation) on a wireless communication apparatus on a rear seat. It is further conceivable to operate a car navigation or to listen to a digital broadcast received by the onboard information equipment on the wireless communication apparatus.

As for connection between such onboard information equipment and the in-vehicle wireless communication apparatus, it is considered to use a wireless LAN. The term "wireless LAN" refers to a technique that utilizes IEEE802.11b/g/n or the like which is created by international standardization activity, and is used in personal computers and game platforms as well.

Communication using a wireless LAN is widely used: wireless LAN routers are installed in offices and homes and are used for connecting to personal computers. In addition, public wireless LAN spots have been increasing recently as places that enable using a wireless LAN out of doors.

Figure 2:
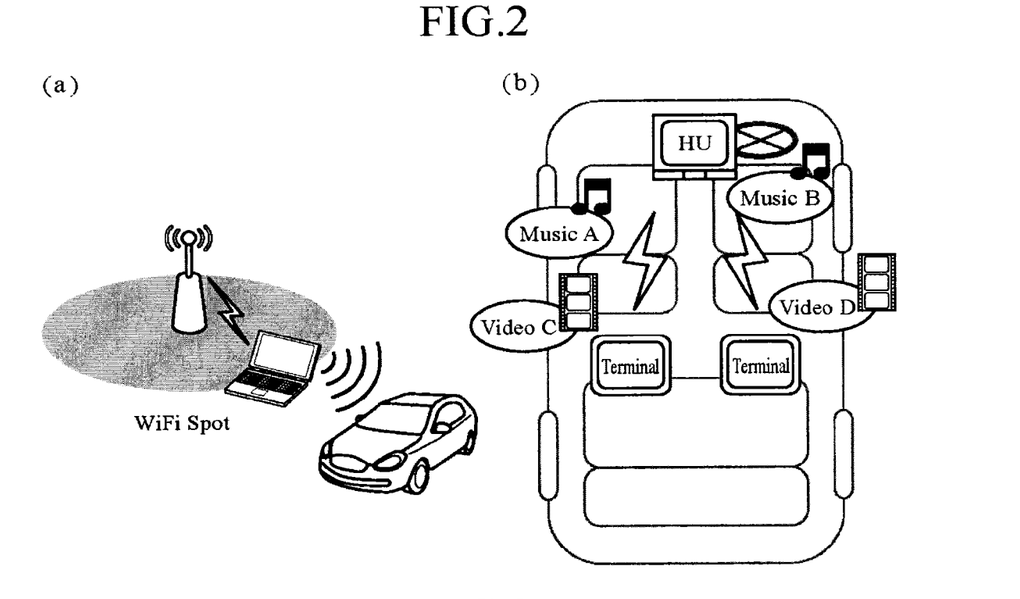
FIG. 2 is a diagram showing an example when a band cannot be reserved in the wireless communication apparatus.

However, if another wireless LAN network exists in the surroundings, there are some cases where communication conditions deteriorate and sufficient usable band cannot be reserved (see FIG. 2(a)).

In addition, when the volume of media data like music and video data to be transmitted increases such as when an increasing number of wireless communication apparatuses are connected, there are some cases where sufficient bands required are not reserved for the individual data (see FIG. 2(b)).

Accordingly, it becomes necessary to control band allocation for carrying out the individual media transmission.

Up to the present, techniques for controlling bands in the transmission of the media data have been proposed as to the onboard information equipment. For example, a Patent Document 1 discloses a method of transmitting and using a plurality of pieces of multimedia information safely in a vehicle within a limited frequency band in an in-vehicle multimedia information provider apparatus. In the Patent Document 1, a band necessary for the transmission is assigned successively according to a request, and if there is a band that terminates its use, the allocation of the bands currently in use is altered in such a manner that the vacant bands are not divided. In addition, an order of priority of the transmission information is determined in advance so that when the data with a priority like a telephone conversation occurs, the band allocation to all the transmission data is relinquished once to allocate a band to the high priority data.

PRIOR ART DOCUMENT

Patent Document

Patent Document 1: Japanese Patent Laid-Open No. 2003-92572.

DISCLOSURE OF THE INVENTION

Problems to be Solved by the Invention

However, the conventional technique as described in the Patent Document 1 carries out data transmission in accordance with the order of priority determined for each transmission information, and does not take account of the usage situation of a user, offering a problem of being unable to perform appropriate band allocation. In addition, since available bands are fixed, it has a problem in that when the available bands alter because of the influence of another wireless network occurring at wireless communication, it cannot deal with that.

The present invention is implemented to solve the foregoing problems. Therefore it is an object of the present invention to provide a wireless communication apparatus capable of carrying out appropriate band allocation suitable for the usage situation of a user even when the available bands alter and communication conditions deteriorate in the wireless communication apparatus that receives media data like music and images from the onboard information equipment like a car navigation system through wireless communication.

Means for Solving the Problems

To accomplish the foregoing object, a wireless communication apparatus in accordance with the present invention comprises, in a wireless communication apparatus that carries out wireless communication with onboard information equipment installed in a vehicle, a receiver that receives media data from the onboard information equipment; a playback processing unit that outputs the media data the receiver receives; a communication state retaining unit that keeps communication state information between the onboard information equipment and the wireless communication apparatus; a usage situation deciding unit that decides a usage situation of the wireless communication apparatus from vehicle surrounding information, and generates usage situation information; a quality deciding unit that decides quality of the media data using the communication state information retained in the communication state retaining unit and the usage situation information generated by the usage situation deciding unit; and a transmitter that transmits the quality generated by the quality deciding unit to the onboard information equipment as quality information of the media data.

Advantages of the Invention

According to the wireless communication apparatus in accordance with the present invention, it determines the quality of the media data in conformity with the usage situation of a user rather than with the fixed priority based on the data classification, thereby being able to carryout appropriate band allocation suitable for the usage situation of the user. In addition, even when the influence from another wireless network changes because of the movement, deciding the quality of the media data according to the alteration of the available bands enables carrying out the band allocation in conformity with that state.

BEST MODE FOR CARRYING OUT THE INVENTION

The best mode for carrying out the invention will now be described with reference to the accompanying drawings.
Embodiment 1

Figure 1:
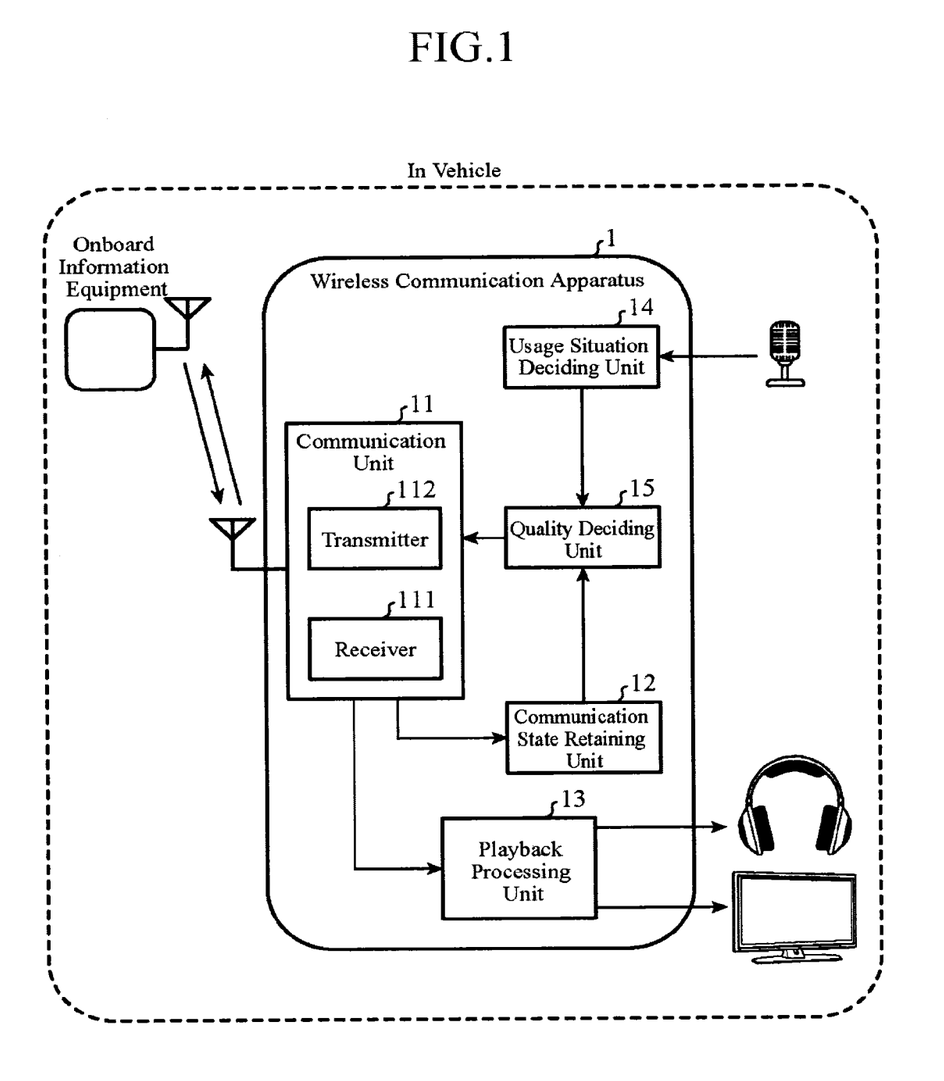
FIG. 1 is a block diagram showing a configuration of a wireless communication apparatus of an embodiment 1 in accordance with the present invention.

FIG. 1 is a block diagram showing a configuration of a wireless communication apparatus of an embodiment 1 in accordance with the present invention.

The wireless communication apparatus is installed in a vehicle such as a car.

In FIG. 1, the wireless communication apparatus 1 comprises a communication unit 11, a communication state retaining unit 12, a playback processing unit 13, a usage situation deciding unit 14, and a quality deciding unit 15.

In addition, the communication unit 11 comprises a receiver 111 and a transmitter 112.

Furthermore, in FIG. 1, the wireless communication apparatus 1 carries out wireless communication with onboard information equipment typified by a car navigation system.

In the wireless communication apparatus 1, the receiver 111 of the communication unit 11 conducts wireless communication with the onboard information equipment, and receives media data such as music data and video data (image data) from the onboard information equipment. For example, it receives the media data such as music, video images and navigation pictures the onboard information equipment retains, and terrestrial digital broadcasts. In addition, the receiver 111 transmits the media data received from the onboard information equipment to the playback processing unit 13, and transmits the communication state between the onboard information equipment and the wireless communication apparatus such as an error and omission of the data found during the reception of the media data to the communication state retaining unit 12 as the communication state information. The communication state information includes the error rate and loss rate of a packet, for example.

The communication state retaining unit 12 keeps the communication state information it receives from the receiver 111. In addition, it transmits the communication state information to the quality deciding unit 15 as the need arises.

The playback processing unit 13 supplies the media data it receives from the receiver 111 to a speaker or a screen. On this occasion, the playback processing unit 13 decodes the media data and outputs.

The usage situation deciding unit 14 decides the usage situation of the wireless communication apparatus by a user from the vehicle surrounding information, and generates the usage situation information and transmits it to the quality deciding unit 15. More specifically, it collects in-vehicle sound from a microphone, detects the presence or absence of voice data using a voice recognition technique, removes music playback data and navigation voice guidance data from the voice data detected when carrying out the music playback or navigation voice guidance, and detects the presence or absence of the voice data. Incidentally, as for a method of detecting the presence or absence of the voice data using the voice recognition technique, since it is a widely known technique, the description thereof will be omitted here.

If it decides that the voice data is present, it concludes that conversation occurs in the vehicle, thereby deciding that they have a conversation.

Figure 4:
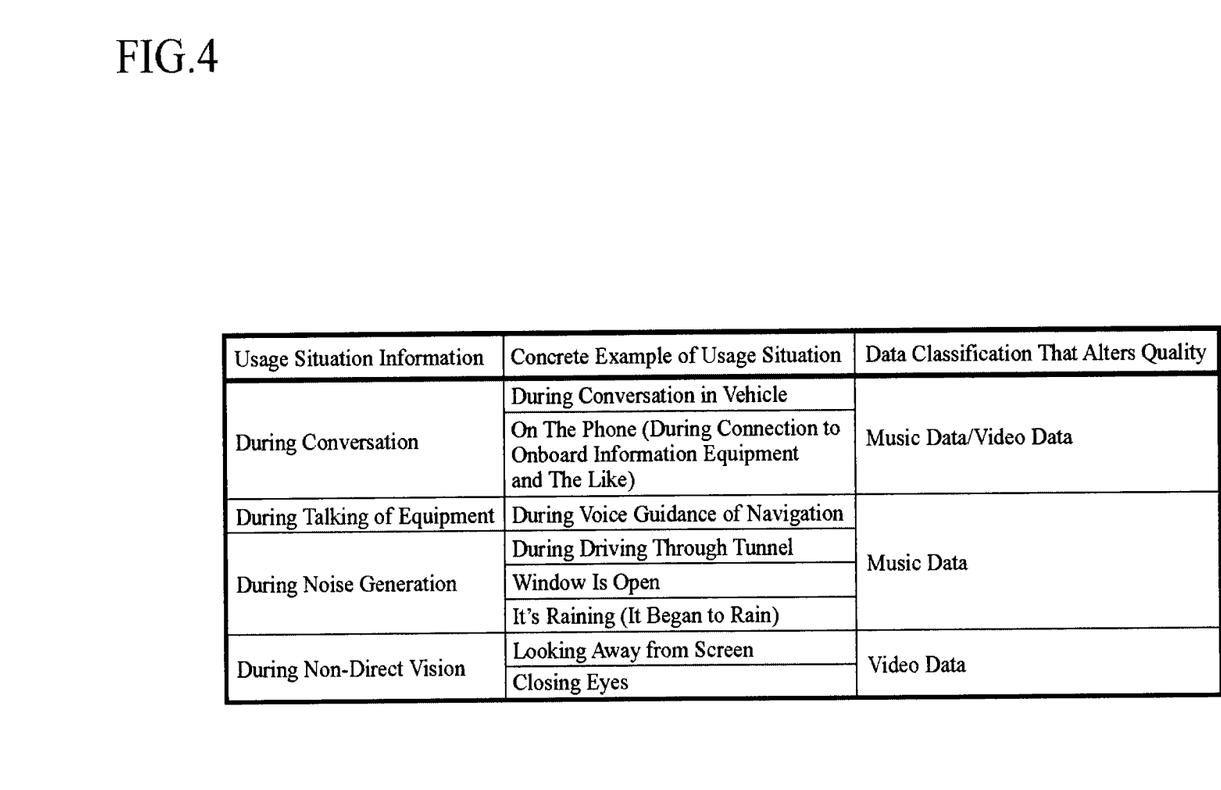
FIG. 4 is a table showing an example of usage situations contained in usage situation information.

Incidentally, although the embodiment 1 uses the usage situation information for deciding that they are in conversation, the usage situation information is also used to decide that the equipment is talking, noise is occurring, non-direct viewing is being performed in addition to that they are in conversation. FIG. 4 shows an example of usage situations contained in the usage situation information. Incidentally, the term "music data" refers to the playback data of music and voice guidance data of navigation.

The quality deciding unit 15 decides the quality of the media data using the communication state information retained in the communication state retaining unit 12 and the usage situation information generated by the usage situation deciding unit 14.

The transmitter 112 of the communication unit 11 transmits the quality of the media data decided by the quality deciding unit 15 to the onboard information equipment as the quality information. The onboard information equipment alters the quality level of the media data to be transmitted to the wireless communication apparatus 1 in accordance with the quality information on the media data the transmitter 112 transmits.

Next, the decision processing of the quality of the media data by the quality deciding unit 15 will be described concretely with reference to a flowchart.

Figure 3:
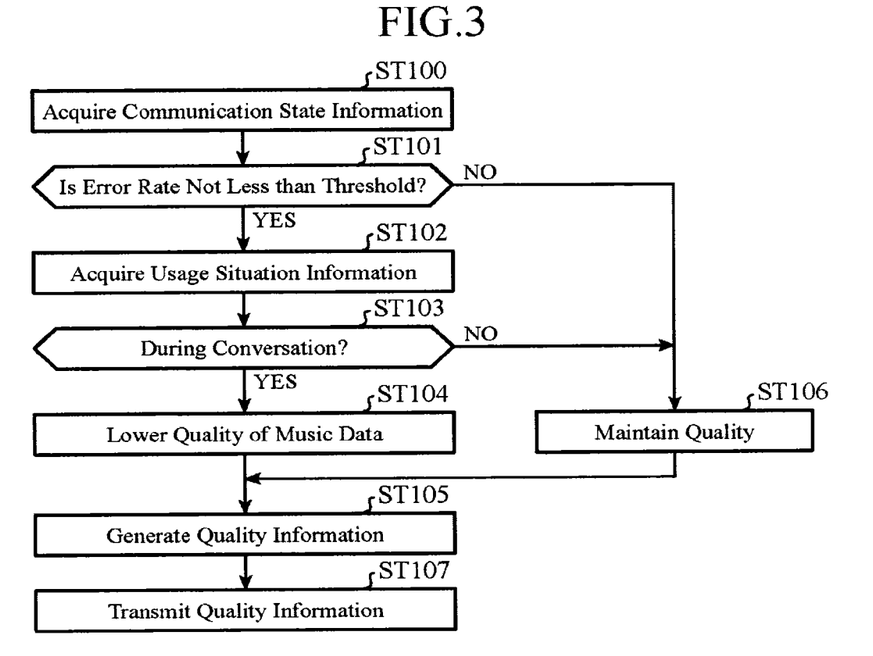
FIG. 3 is a flowchart showing quality decision processing in the quality deciding unit of the wireless communication apparatus of the embodiment 1 in accordance with the present invention.

FIG. 3 is a flowchart showing the quality decision processing in the quality deciding unit 15 of the wireless communication apparatus of the embodiment 1 in accordance with the present invention.

First, the quality deciding unit 15 acquires the communication state information from the communication state retaining unit 12 (step ST100).

Next, the quality deciding unit 15 decides on whether it is necessary to alter the quality of the media data or not from the communication state information acquired. More specifically, it decides on whether a packet error rate (error rate and loss rate of a packet) contained in the communication state information is not less than a prescribed threshold (step ST101).

Thus, it decides on whether the communication conditions deteriorate or not from whether the packet error rate is not less than the prescribed threshold.

If the packet error rate is less than the prescribed threshold at step ST101 (NO at step ST101), the quality deciding unit 15 does not alter the quality of the media data, and assigns the quality contained in the communication state information as it is as the quality information of the media data (step ST106).

On the other hand, if the packet error rate is not less than the prescribed threshold step ST101 (YES at step ST101), the quality deciding unit 15 decides that the communication conditions deteriorate, and acquires the usage situation information from the usage situation deciding unit 14 (step ST102). Incidentally, it is also possible to acquire the usage situation information before deciding on whether the communication conditions deteriorate or not at step ST101.

Next, the quality deciding unit 15 decides on whether they have a conversation or not from the usage situation information acquired at step ST102 (step ST103).

If it decides at step ST103 that they are not in conversation (NO at step ST103), it does not alter the quality of the media data, and assigns the quality information contained in the communication state information as the quality of the media data (step ST106).

On the other hand, if it decides at step ST103 that they are in conversation (YES at step ST103), the quality deciding unit 15 reduces the quality level of the music data among the quality of the media data contained in the communication state information, and assigns the quality after the alteration to the quality of the media data (step ST104).

In other words, when the usage situation indicates that they are in conversation, for example, it is conceivable that the users pay attention to the conversation, and that they do not care about the degradation in the music data during playback. Accordingly, the quality deciding unit 15 lowers the quality of the music data if the usage situation indicates that they are in conversation.

The quality deciding unit 15 generates the quality information in accordance with the quality level it decides at step ST104 or step ST106 (step ST105), and transmits the quality information generated to the communication unit 11 (step ST107).

Incidentally, at the generation of the quality information, if the packet error rate (error rate and loss rate of a packet) is improved for a fixed time period after lowering the quality of the media data level at step ST104, the quality deciding unit 15 is designed to return the quality information to that contained in the original communication state information. In addition, as for the setting processing of the quality information, when viewing and hearing the next media data, the quality deciding unit 15 generates new quality information again through the foregoing processing from the quality information contained in the communication state information of the media data.

As described above, according to the present embodiment 1, when the communication state deteriorates, it can provide the quality in conformity with the usage situation of a user rather than the fixed priority assigned according to the types of the media data, thereby enabling the onboard apparatus side to set the band. In addition, reducing the band used enables increasing the bands available for the transmission of other media data. Furthermore, even if the influence from another wireless network changes due to movement, deciding the quality in conformity with the alteration of the available bands enables the band allocation in accordance with that state.

Incidentally, although the present embodiment 1 is configured in such a manner as to lower the quality level of the music data during conversation, since it is conceivable that the degree of attention to a picture reduces during the conversation, it is also possible to lower the quality level of the video data.

In addition, although the usage situation deciding unit 14 assigns whether they are in conversation in the vehicle or not as the usage situation in the present embodiment 1, a configuration is also possible which assigns whether the equipment is talking (during voice guidance of navigation) or not as the usage situation. In this case, to detect on whether the equipment is talking (during voice guidance of navigation), a configuration is also possible which receives the information indicating that the equipment is talking from the onboard information equipment, in addition to the method of using the voice recognition technique to carry out the voice detection from the in-vehicle sound the microphone collects.

Furthermore, a configuration is also possible which includes telephone conversation via a mobile phone as the usage situation indicating that they are in conversation. In this case, besides the detection through the voice recognition using the microphone, a method is also applicable which receives the connection information from the onboard information equipment to detect having a conversation, if the mobile phone is connected to the onboard information equipment using a standard such as Bluetooth (a registered trademark).

Embodiment 2

Figure 5:
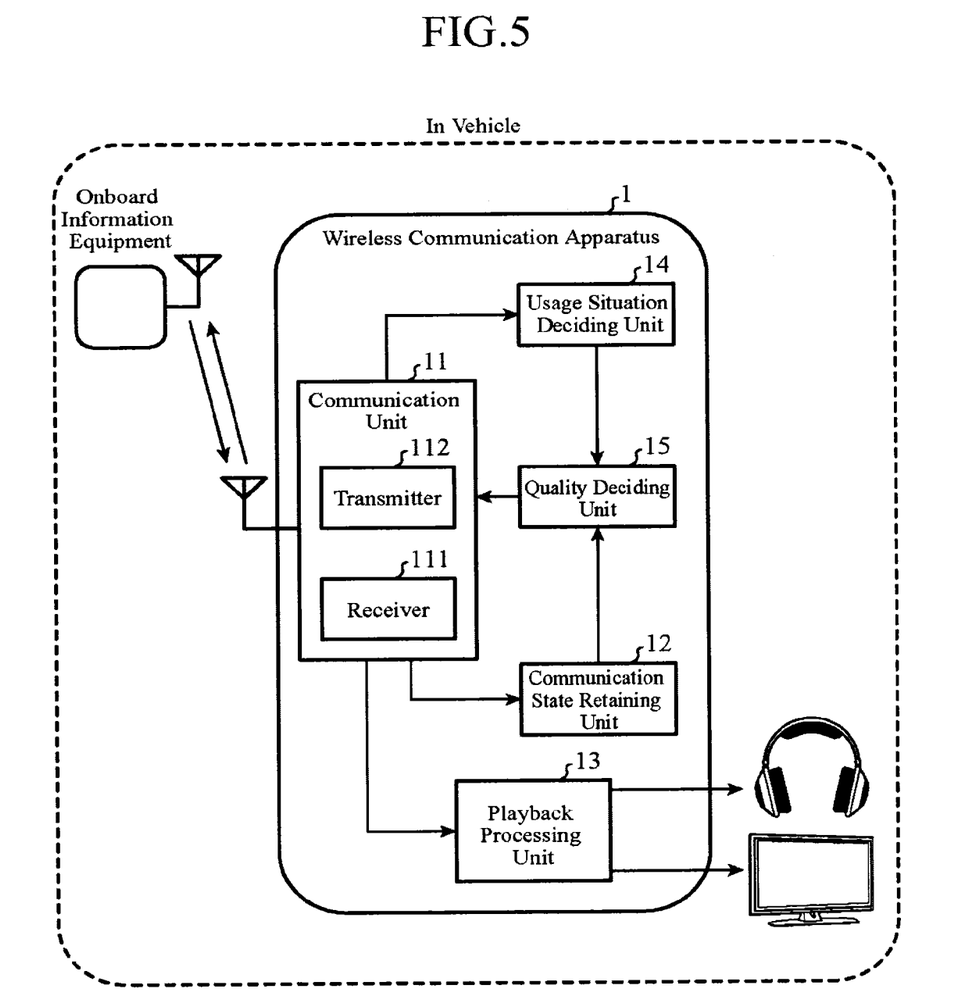
FIG. 5 is a block diagram showing a configuration of a wireless communication apparatus of an embodiment 2 in accordance with the present invention.

FIG. 5 is a block diagram showing a configuration of a wireless communication apparatus of an embodiment 2 in accordance with the present invention.

Incidentally, as for the same components as those described in the embodiment 1, their redundant description will be omitted.

The present embodiment 2 differs from the embodiment 1 in that the usage situation deciding unit 14 uses the vehicle information received from the onboard information equipment instead of the input from the microphone to make a decision of the usage situation. The vehicle information contains the map information the onboard information equipment retains, and the operation information of the onboard information equipment.

The receiver 111 of the communication unit 11 receives the vehicle information along with the media data from the onboard information equipment, and transmits the vehicle information received to the usage situation deciding unit 14.

The usage situation deciding unit 14 decides a produced state of in-vehicle noise from the vehicle information delivered from the receiver 111, and generates the usage situation information on whether the noise is occurring or not. For example, when it receives the map information from the vehicle information, the usage situation deciding unit 14 decides on whether the vehicle is driving through a tunnel or not from the map information received. If the vehicle is driving through the tunnel, the noise is expected to increase. Accordingly, that the noise is occurring is assigned as the usage situation.

In addition, consider a case of receiving the operation information of the onboard information equipment as the vehicle information, and the operation information received is opening and closing operation information of a window, for example. If the window is opened, noise will increase and the usage situation deciding unit 14 decides that noise is occurring. Likewise, when the operation information received is the operation information of the wipers, since it is raining and noise increases, the usage situation deciding unit 14 decides that noise is occurring.

In this way, the usage situation deciding unit 14 decides a usage situation as to whether noise is occurring or not using the vehicle information received from the receiver 111.

The quality deciding unit 15 decides the quality of the media data using the usage situation information on whether the noise is occurring or not, which the usage situation deciding unit 14 creates. More specifically, if the usage situation information indicates that the noise is occurring, the quality deciding unit 15 carries out the processing of lowering the quality level of the music data. Thus, the present embodiment 2 differs from the embodiment 1 only in that the quality decision processing uses the usage situation that the noise is occurring instead of the usage situation indicating that they are in conversation.

As described above, according to the present embodiment 2, it is configured in such a manner that it decides on whether the noise is occurring by deciding the produced state of the in-vehicle noise from the vehicle information received from the onboard information equipment, and lowers the quality of the music data if the noise is occurring. Accordingly, it can carry out the band allocation of the media data in conformity with the usage situation of the user, in which case there is no problem of lowering the quality of music data because the music becomes hard to hear while the noise is occurring. In addition, reducing the band by lowering the quality of the music data can increase the available bands for other media data.

Embodiment 3

Figure 6:
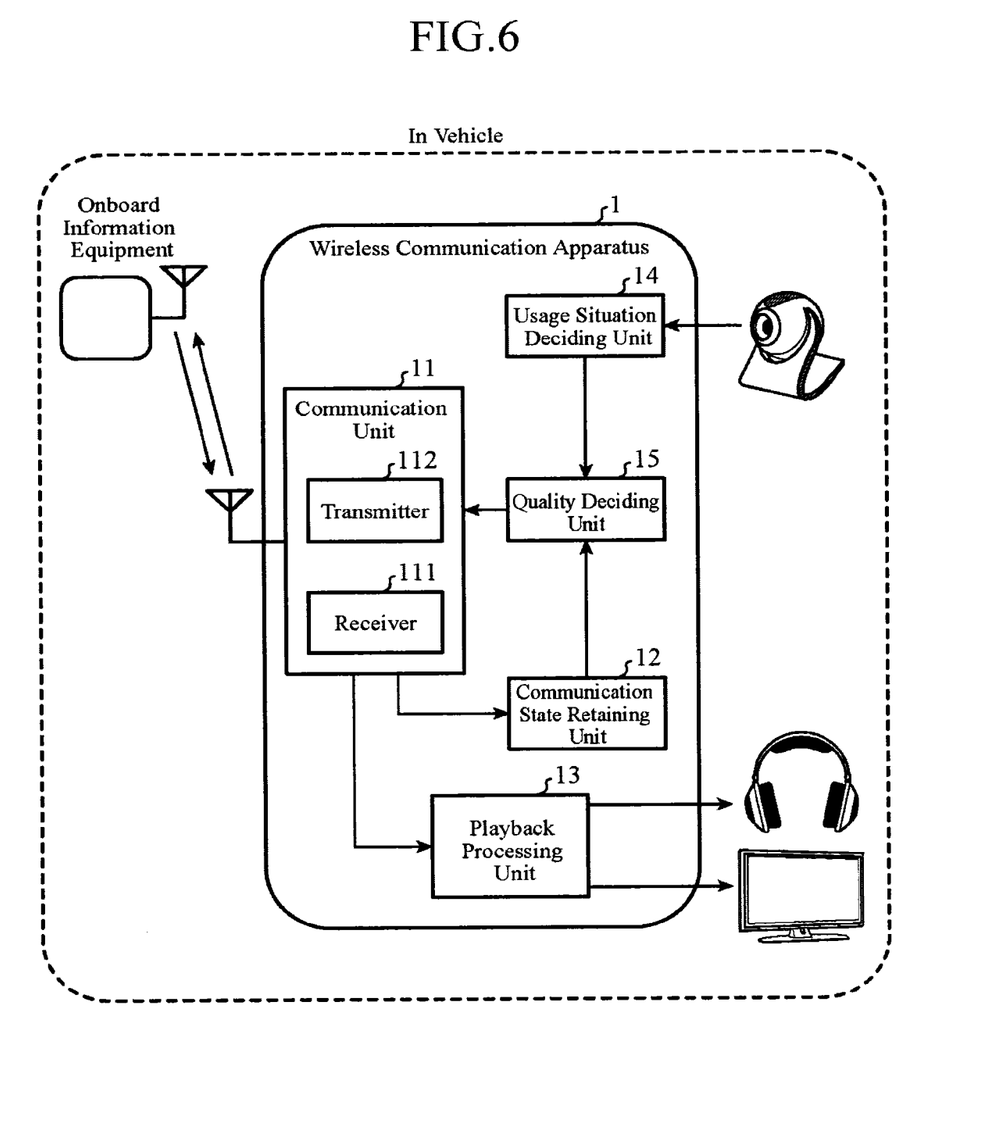
FIG. 6 is a block diagram showing a configuration of a wireless communication apparatus of an embodiment 3 in accordance with the present invention.

FIG. 6 is a block diagram showing a configuration of a wireless communication apparatus of an embodiment 3 in accordance with the present invention.

Incidentally, the duplicate description of the same components as those described in the embodiment 1 will be omitted.

The present embodiment 3 differs from the embodiment 1 in that when the usage situation deciding unit 14 decides the usage situation, it decides a direct viewing state on whether a user watches a picture or not in accordance with an image taken with a camera installed in the vehicle rather than the input from the microphone.

The usage situation deciding unit 14 acquires an image of a user from the camera, and detects the face of the user from the camera image acquired using an existing facial recognition technique. If the face of the user detected does not look forward to the picture, the usage situation deciding unit 19 decides that the user does not watch the picture, and generates the usage situation information of non-direct viewing. In addition, it decides the direct viewing state to the picture of the user by using a line-of-sight detection technique, and if the line of sight is off the picture, it generates the usage situation information indicating non-direct viewing.

In this way, the usage situation deciding unit 14 decides the usage situation as to whether the user has the non-direct viewing of the picture or not using the facial image of the user received from the camera.

The quality deciding unit 15 decides the quality of the media data using the usage situation information on whether the user has the non-direct viewing or not, which the usage situation deciding unit 14 decides. More specifically, if the usage situation information indicates the non-direct viewing, the quality deciding unit 15 carries out the processing of lowering the quality level of the video data. Thus, the present embodiment 3 differs from the embodiment 1 only in that the quality decision processing uses the usage situation indicating the non-direct viewing instead of the usage situation indicating that they are in conversation, and in that it lowers the quality of the video data instead of the quality of the music data.

As described above, according to the present embodiment 3, it is configured in such a manner that the usage situation deciding unit 14 generates the usage situation information on whether the user watches a picture or not in accordance with an image taken with the camera, and if the usage situation information indicates the non-direct viewing, the quality deciding unit 15 lowers the quality of the video data. Accordingly, it can carry out the band allocation of the media data in conformity with the usage situation of the user that no problem arises by lowering the quality of the video data while the user does not watch the screen. In addition, reducing the band to be used by lowering the quality of the video data can increase the available bands for other media data.

Embodiment 4

Figure 7:
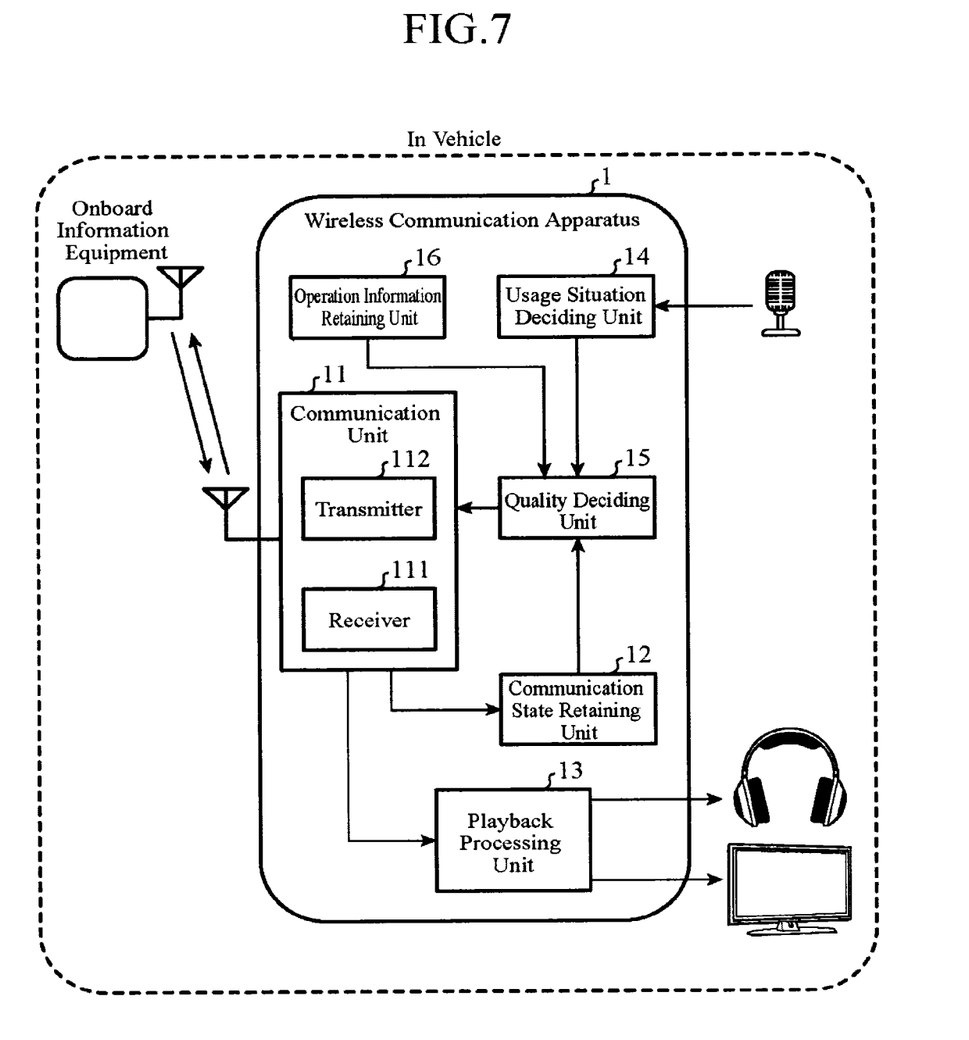
FIG. 7 is a block diagram showing a configuration of a wireless communication apparatus of an embodiment 4 in accordance with the present invention.

FIG. 7 is a block diagram showing a configuration of a wireless communication apparatus of an embodiment 4 in accordance with the present invention.

Incidentally, the duplicate description of the same components as those described in the embodiment 1 will be omitted.

The embodiment 4 described below comprises an operation information retaining unit 16 in addition to the configuration of the embodiment 1 shown in FIG. 1.

The operation information retaining unit 16 keeps the operation information of the wireless communication apparatus 1, and transmits the operation information to the quality deciding unit 15. The operation information contains information about the presence or absence of alteration of the volume such as turning up and down of the volume.

The quality deciding unit 15 decides the quality of the media data not only using the communication state information received from the communication state retaining unit 12 and the usage situation information received from the usage situation deciding unit 14, but also using the operation information received from the operation information retaining unit 16. For example, if the usage situation the usage situation deciding unit 14 decides indicates that they are in conversation, and if a user turns up the volume as the volume operation, it is conceivable that the user regards it more important to listen to music than the conversation. Accordingly, even if the usage situation the usage situation deciding unit 14 decides indicates that they are in conversation, if the user turns up the volume, the quality deciding unit 15 does not alter the quality of the media data.

Next, the quality decision processing of the quality deciding unit 15 will be described concretely with reference to a flowchart.

Figure 8:
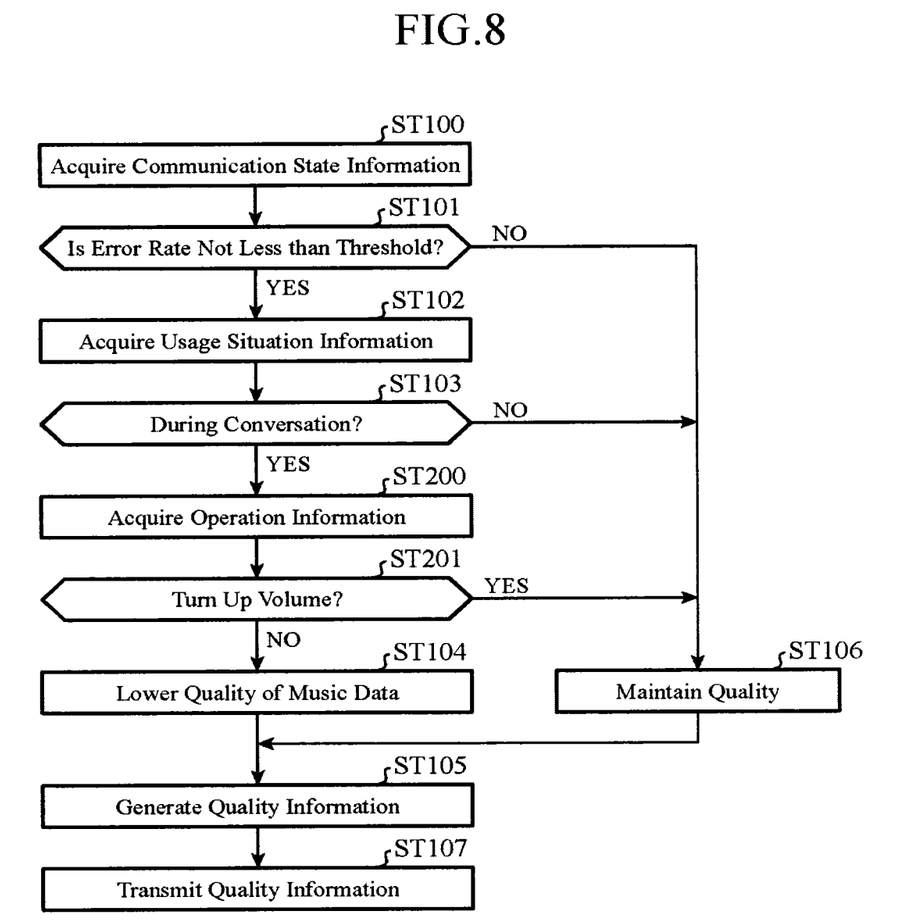
FIG. 8 is a flowchart showing quality decision processing in the quality deciding unit of the wireless communication apparatus of the embodiment 4 in accordance with the present invention.

FIG. 8 is a flowchart showing the quality decision processing in the quality deciding unit of the wireless communication apparatus of the present embodiment 4 in accordance with the present invention.

In the following, points of difference from the quality decision processing shown in the flowchart of FIG. 3 in the embodiment 1 will be described mainly.

The processing from step ST100 to ST103 of FIG. 8 is the same as the processing from step ST100 to ST103 of FIG. 3.

When it decides at step ST103 that they are in conversation (YES at step ST103), the quality deciding unit 15 acquires the operation information from the operation information retaining unit 16 (step ST200), and decides on whether the user turns up the volume or not (step ST201). More specifically, the quality deciding unit 15 decides on whether the operation information received from the operation information retaining unit 16 contains the alteration operation of the volume for turning up the volume or not.

If it detects the operation of turning up the volume at step ST201 (YES at step ST201), the quality deciding unit 15 does not alter the quality level of the music data (step ST106).

On the other hand, unless it detects the operation of turning up the volume (NO at step ST201), the quality deciding unit 15 lowers the quality level of the music data, and assigns the quality after the alteration as the quality of the media data (step ST104). As for the processing after that from step ST105 to ST107, it is the same as the processing from step ST105 to ST107 of FIG. 3.

Incidentally, although the quality level of the music data is not altered when the operation of turning up the volume is detected here, a configuration is also possible which raises the quality level of the music data or returns it to the normal level.

In addition, although the embodiment is described by way of example that alters the quality level at the time of the volume alteration operation using the usage situation as to whether they are in conversation or not, a configuration is also possible which uses such a usage situation that the equipment is talking or noise is occurring instead of the usage situation that they are in conversation.

As described above, according to the present embodiment 4, it is configured in such a manner that even if the communication state deteriorates or users are in conversation, if a user carries out the alteration operation of turning up the volume, it maintains the quality of the media data level by considering that the user pays attention to the music. Accordingly, it can maintain the media data quality in conformity with the usage situation of the user.

Embodiment 5

The configuration of the wireless communication apparatus of the present embodiment 5 in accordance with the present invention is the same as that of FIG. 1 shown in the embodiment 1.

The points of difference between the present embodiment 5 and the embodiment 1 are that the wireless communication apparatus 1 generates the user information about the terminal by the usage situation deciding unit 14, and that the usage situation deciding unit 14 transmits the user information of the wireless communication apparatus 1 to the quality deciding unit 15 along with the usage situation information of the wireless communication apparatus 1. More specifically, the usage situation deciding unit 14 generates information on whether the user of the wireless communication apparatus 1 is a child or not as the user information set in the wireless communication apparatus 1, and transmits it to the quality deciding unit 15.

The quality deciding unit 15 decides the quality of the media data by using the usage situation information and the user information acquired from the usage situation deciding unit 14 and the communication state information received from the communication state retaining unit 12. For example, even if the usage situation the usage situation deciding unit 14 decides indicates that they are in conversation, if the user is a child, it is conceivable that the user will pay attention to a picture or music rather than the conversation, and hence the quality of the media data is not altered. The usage situation deciding unit 14 decides on whether the user is a child or not from a fact, for example, whether an ID for identifying the user is an ID indicating a child or not, whether, when a seating sensor for detecting whether someone takes a seat or not can estimate his or her weight to some extent, the weight is within a certain range or not, whether, when the length of a seat belt can be detected, the length is within a certain range, and whether the media data played back is for a child or not.

Next, the quality decision processing in the quality deciding unit 15 will be described concretely with reference to a flowchart.

Figure 9:
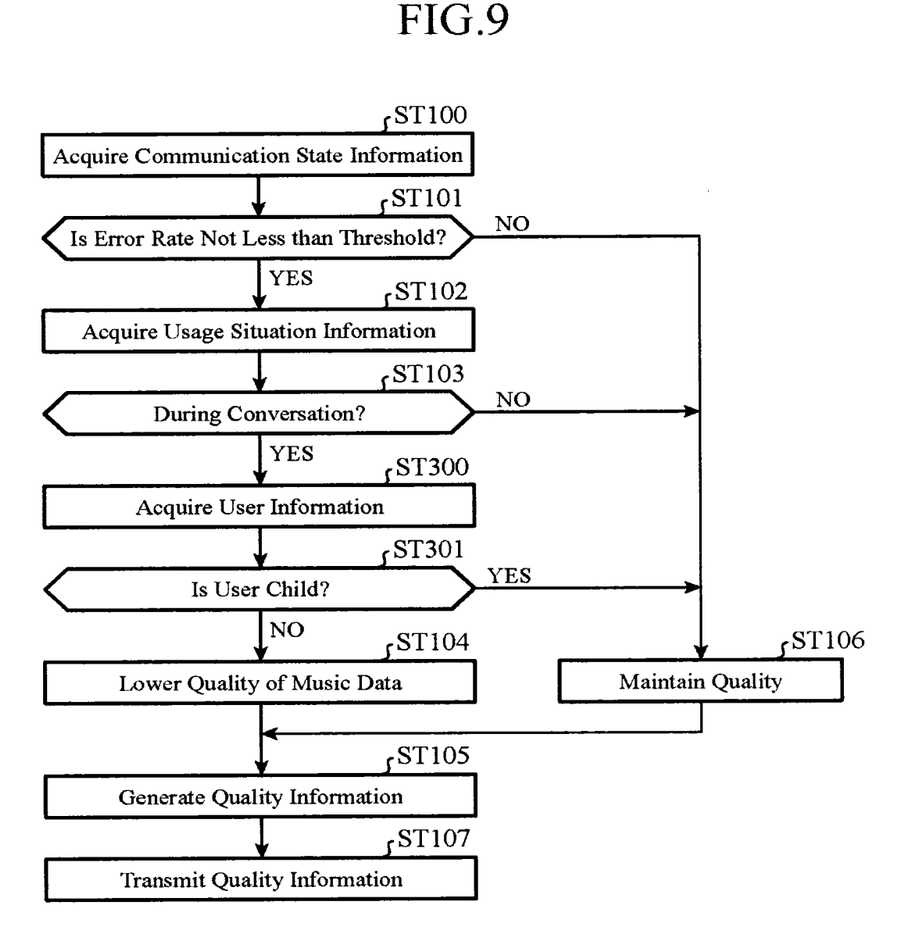
FIG. 9 is a flowchart showing quality decision processing in the quality deciding unit of a wireless communication apparatus of an embodiment 5 in accordance with the present invention.

FIG. 9 is a flowchart showing the quality decision processing in the quality deciding unit 15 of the wireless communication apparatus of the present embodiment 5 in accordance with the present invention.

In the following description, points of difference from the quality decision processing shown in the flowchart of FIG. 3 in the embodiment 1 will be described mainly.

The processing from step ST100 to step ST103 in FIG. 9 is the same as the processing from step ST100 to step ST103 of FIG. 3.

If it decides that they are in conversation at step ST103, the quality deciding unit 15 acquires the user information from the usage situation deciding unit 14 (step ST300), and decides on whether the user is a child or not (step ST301).

If the quality deciding unit 15 decides at step ST301 that the user of the wireless communication apparatus 1 is a child (YES at step ST301), it maintains the quality level of the music data (step ST106).

On the other hand, if the quality deciding unit 15 decides that the user of the wireless communication apparatus 1 is not a child (NO at step ST301), it lowers the quality of the music data, and assigns the quality after the alteration as the quality of the media data (step ST104). After that, the processing from step ST105 to step ST107 is the same as the processing from step ST105 to step ST107 of FIG. 3.

As described above, according to the present embodiment 5, it is configured in such a manner as to alter the quality of the media data according to a user in such a fashion that when the user of the wireless communication apparatus 1 is a child, it does not alter the quality of the media data on the assumption that the user pays attention to a picture or music rather than to the conversation. Thus, it can control the quality of the media data in conformity with the usage situation of the user in such a manner that it can maintain the quality preferentially when the user is a child.

Incidentally, when the present embodiment 5 decides that the user of the wireless communication apparatus 1 is not a child, it lowers the quality level of the music data. However, it can be configured in such a manner as to lower the quality level of the video data, or to lower the quality level of both the music data and video data as well.

Incidentally, it is to be understood that a free combination of the individual embodiments, variations of any components of the individual embodiments or removal of any components of the individual embodiments is possible within the scope of the present invention.

INDUSTRIAL APPLICABILITY

A wireless communication apparatus in accordance with the present invention decides the quality of the media data according to the usage situation of a user rather than the fixed priority based on the data classification, thereby being able to assign an appropriate band suitable for the usage situation of the user. Accordingly, it is applicable to a wireless communication apparatus mounted in a vehicle such as a car.

DESCRIPTION OF REFERENCE SYMBOLS

1 wireless communication apparatus; 11 communication unit; 12 communication state retaining unit; 13 playback processing unit; 14 usage situation deciding unit; 15 quality deciding unit; 16 operation information retaining unit; 111 receiver; 112 transmitter.

What is claimed is:

1. A wireless communication apparatus that carries out wireless communication with onboard information equipment installed in a vehicle, the wireless communication apparatus comprising:
   a receiver that receives media data from the onboard information equipment, and detects a communication state between the onboard information equipment and the wireless communication apparatus;
   a playback device that outputs the media data the receiver receives;
   a processor that
      keeps communication state information indicating the communication state detected by the receiver,
      decides an in-vehicle situation of the vehicle from vehicle surrounding information obtained at the vehicle, and generates usage situation information indicating the decided in-vehicle situation,
      decides whether or not to alter quality to be applied to the media data, which is transmitted from the onboard information equipment, by using a combination of the communication state information and the usage situation information, and
      when a packet error rate contained in the communication state information is greater than a threshold, the processor collects in-vehicle sound with a microphone as the vehicle surrounding information, generates the usage situation information on whether to be in conversation or not from the in-vehicle sound, and decides to lower the quality of the media data when the usage situation information indicates being in conversation; and
   a transmitter that transmits information indicating the quality decided by the processor to the onboard information equipment.

2. The wireless communication apparatus according to claim 1, wherein
   when the packet error rate contained in the communication state information is less than the threshold, the processor decides not to alter the quality of the media data.

3. The wireless communication apparatus according to claim 1, wherein
   when the packet error rate contained in the communication state information is greater than the threshold, the processor generates the usage situation information on whether noise is taking place or not from the vehicle information received from the onboard information equipment as the vehicle surrounding information, and decides to lower the quality of the media data when the usage situation information indicates that the noise is taking place.

4. The wireless communication apparatus according to claim 1, wherein
   when the packet error rate contained in the communication state information is greater than the threshold, the processor generates the usage situation information on whether a user watches a screen or not from an image taken with a camera as the vehicle surrounding information, and decides to lower the quality of the media data when the usage situation information indicates that the user does not watch the screen.

5. The wireless communication apparatus according to claim 1, wherein the processor
   retains operation information of the wireless communication apparatus, and
   decides the quality of the media data using not only the communication state information and the usage situation information, but also the operation information.

6. The wireless communication apparatus according to claim 5, wherein
   the operation information contains information indicating an alteration operation of volume on the wireless communication apparatus in a case where the packet error rate contained in the communication state information is greater than the threshold; and
   the processor decides not to alter the quality of the media data when the operation information indicates that the volume is turned up, and decides to lower the quality of the media data when the operation information does not indicate that the volume is turned up.

7. The wireless communication apparatus according to claim 1, wherein the processor
   generates user information by deciding a user of the wireless communication apparatus when the packet error rate contained in the communication state information is greater than the threshold; and
   decides the quality of the media data using not only the communication state information and the usage situation information, but also the user information.

8. The wireless communication apparatus according to claim 7, wherein
   the user information contains information on whether the user of the wireless communication apparatus is a child or not; and
   the processor decides not to alter the quality of the media data when the user information indicates a child.

* * * * *